United States Patent
Sakata et al.

(10) Patent No.: US 7,258,818 B2
(45) Date of Patent: Aug. 21, 2007

(54) PRODUCTION METHOD OF SIALON-BASED PHOSPHOR, AND SIALON-BASED PHOSPHOR

(75) Inventors: Shin-ichi Sakata, Ube (JP); Takeshi Yamao, Ube (JP); Tetsuo Yamada, Ube (JP)

(73) Assignee: Ube Industries, Ltd. (JP)

( * ) Notice: Subject to any disclaimer, the term of this patent is extended or adjusted under 35 U.S.C. 154(b) by 261 days.

(21) Appl. No.: 11/000,853

(22) Filed: Dec. 1, 2004

(65) Prior Publication Data
US 2005/0116244 A1     Jun. 2, 2005

(30) Foreign Application Priority Data
Dec. 1, 2003   (JP) ............... 2003-401202

(51) Int. Cl.
*C09K 11/79*  (2006.01)
*C09K 11/80*  (2006.01)
*C09K 11/59*  (2006.01)
*C09K 11/60*  (2006.01)

(52) U.S. Cl. ............................................. 252/301.4 F
(58) Field of Classification Search .......... 252/301.4 F
See application file for complete search history.

(56) References Cited
U.S. PATENT DOCUMENTS
6,657,379 B2 * 12/2003 Ellens et al. ................. 313/503
6,670,748 B2 * 12/2003 Ellens et al. ................. 313/503
6,674,233 B2 *  1/2004 Ellens et al. ................. 313/503

FOREIGN PATENT DOCUMENTS
EP       1445295    *  8/2004
JP   2002-363554 A    12/2002

* cited by examiner

*Primary Examiner*—C. Melissa Koslow
(74) *Attorney, Agent, or Firm*—DLA Piper US LLP

(57) ABSTRACT

To provide a sialon-based phosphor capable of forming a thin film by mixing it with a resin, and giving a uniform photoluminescent light with high light emission intensity, and to provide a method for producing a sialon-based phosphor not having excessively large agglomerated particles and a wide particle size distribution, there is provided a method for producing an α-sialon based phosphor represented by the formula:

$$M_xLn_ySi_{12-(m+n)}Al_{(m+n)}O_nN_{16-n}$$

wherein M is at least one metal selected from Ca, Mg, Y and Li, Ln is at least one lanthanide metal selected from Eu, Dy, Er, Tb, Yb and Ce, ax+by=m (assuming that the valence of metal M is a and the valence of lanthanide metal Ln is b), $0<x\leq1.5$, $0.3\leq m\leq4.5$, and $0<n<2.25$), wherein the silicon nitride raw material used as the raw material is a silicon nitride raw material powder comprising amorphous silicon nitride and crystalline silicon nitride.

5 Claims, 1 Drawing Sheet

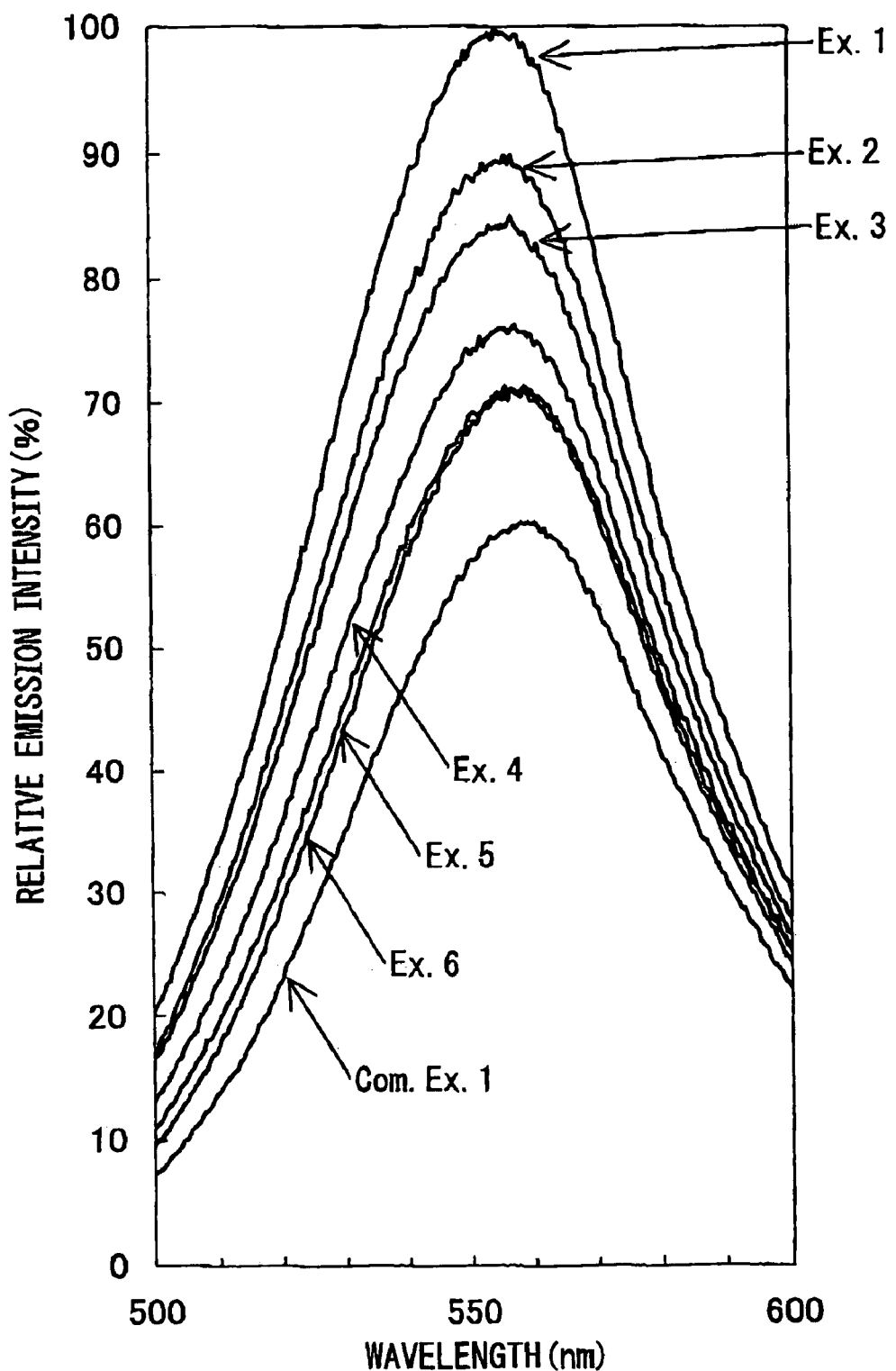

PRODUCTION METHOD OF SIALON-BASED PHOSPHOR, AND SIALON-BASED PHOSPHOR

TECHNICAL FIELD

The present invention relates to a method for producing a material having a function of converting a part of irradiated light into light with a different wavelength from that of the irradiated light and, at the same time, mixing the converted light with the unconverted irradiated light to cause conversion into light having a different color. More specifically, the present invention relates to a method for producing a sialon-based phosphor activated with a rare earth metal element, which is used for a white light emitting diode (white LED) using a blue light emitting diode (blue LED) as the light source. The present invention also relates to a sialon-based phosphor obtained by the production method.

BACKGROUND ART

With recent implementation of blue LED in practical use, studies are being aggressively made to develop white LED by utilizing the blue LED. The white LED is low in power consumption and extended in life as compared with existing white light sources and therefore, its application to a liquid crystal panel backlight, an indoor or an outdoor illumination device, and the like, is proceeding.

The white LED developed at present is obtained by coating Ce-doped YAG (yttrium.aluminum.garnet) on the surface of a blue LED. However, the Ce-doped YAG has a photoluminescent wavelength in the vicinity of 530 nm and when this photoluminescent light and the light of blue LED are mixed to provide white light, the resulting color of the light is slightly blue-tinted and good white light cannot be obtained.

On the other hand, a sialon-based phosphor activated with a rare earth element is known to emit photoluminescent light with a longer wavelength (shifted to the red side) than the photoluminescent wavelength of Ce-doped YAG (see, Japanese Unexamined Patent Publication (Kokai) No. 2002-363554). When this photoluminescent light of sialon-based phosphor is mixed with the light of blue LED, good white light can be obtained. In this way, practical use of a sialon-based phosphor material as a new phosphor material is expected.

However, the phosphor having the composition disclosed in Japanese Unexamined Patent Publication (Kokai) No. 2002-363554 uses crystalline silicon nitride as the raw material and is produced by a hot-pressing method where the reaction into sialon is allowed to proceed while compressing the powder material. The sialon-based phosphor obtained by this method is in the lump form and is not suited for use as a phosphor powder.

The present inventors had attempted to obtain a sialon-based phosphor by mixing a crystalline silicon nitride powder with a calcium source, a rare earth element source and an aluminum source and firing it in an atmospheric pressure furnace. As a result, it was confirmed that a phosphor in the powder state can be obtained by selecting the appropriate particle size of silicon nitride and the reaction conditions, but the powder is a gathering of strongly agglomerated particles (hereinafter called a "agglomerated particles") and the agglomerated particles have a large diameter and a broad and non-uniform particle size distribution. A phosphor comprising such agglomerated particles is improper for forming a thin film by mixing it with a resin and also, the photoluminescent light emitted therefrom is non-uniform and insufficient in the photoluminescent intensity.

The present invention has been made to solve these problems and an object of the present invention is to provide a method for producing a sialon-based phosphor not having a broad size distribution. Another object of the present invention is to provide a sialon-based phosphor, obtained by the method, which can form a thin film and give uniform photoluminescent light with high light emission intensity.

DISCLOSURE OF THE INVENTION

The present invention relates to a method for producing a sialon-based phosphor, comprising mixing a silicon nitride raw material powder with an AlN-containing substance working as an aluminum source, an oxide of metal M (wherein M is at least one metal selected from Ca, Mg, Y and Li) or a precursor substance to an oxide of metal M upon thermal decomposition, and an oxide of lanthanide metal Ln or a precursor substance to an oxide of lanthanide metal Ln upon thermal decomposition, and firing the mixture at 1,400 to 2,000° C. in an inert gas atmosphere containing nitrogen to produce an α-sialon based phosphor represented by the formula;

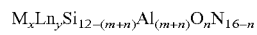
$$M_xLn_ySi_{12-(m+n)}Al_{(m+n)}O_nN_{16-n}$$

wherein M is at least one metal selected from Ca, Mg, Y and Li, Ln is at least one lanthanide metal selected from Eu, Dy, Er, Tb, Yb and Ce, ax+by=m (assuming that the valence of metal M is a and the valence of lanthanide metal Ln is b), $0<x\leq 1.5$, $0.3\leq m<4.5$, and $0<n<2.25$, wherein the silicon nitride raw material powder comprises amorphous silicon nitride and crystalline silicon nitride.

In particular, the ratio of the crystalline silicon nitride in the silicon nitride raw material is preferably from 5 to 95 wt %.

In the production method of a sialon-based phosphor of the present invention, the specific surface area of the silicon nitride raw material powder is preferably from 15 to 300 m²/g.

Also, the silicon nitride raw material powder is preferably a silicon nitride powder obtained by thermally decomposing silicon diimide $(Si(NH)_2)$.

Furthermore, the production method of a sialon-based phosphor of the present invention is characterized in that the silicon nitride raw material is a silicon nitride powder containing both an amorphous component and a crystalline component, obtained by heat-treating an amorphous silicon nitride powder.

The present invention also relates to an α-sialon based phosphor represented by the formula:

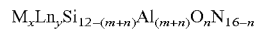
$$M_xLn_ySi_{12-(m+n)}Al_{(m+n)}O_nN_{16-n}$$

(wherein M is at least one metal selected from Ca, Mg, Y and Li, Ln is at least one lanthanide metal selected from Eu, Dy, Er, Tb, Yb and Ce, ax+by=m (assuming that the valence of metal M is a and the valence of lanthanide metal Ln is b), $0<x\leq 1.5$, $0.3\leq m<4.5$, and $0<n<2.25$, wherein the 50% size in the particle size distribution curve of the phosphor particles measured by a laser diffraction/scattering method is from 2 to 19 μm.

In the production method of a phosphor of the present invention, a silicon nitride powder where the ratio of crystalline silicon nitride is from 5 to 95 wt % is used as the raw material and therefore, the produced sialon-based phosphor particles undergo less aggregation, so that the phosphor particles can have appropriate size and distribution and are suited as a phosphor material for forming a thin film by mixing it with a resin and, also, a photoluminescent material of giving uniform photoluminescent light with high light emission intensity can be obtained.

BRIEF DESCRIPTION OF THE DRAWING

FIG. 1 is a view showing the photoluminescent spectra of sialon-based phosphors produced by using a silicon nitride powder containing both an amorphous component and a crystalline component.

BEST MODE FOR CARRYING OUT THE INVENTION

The present invention is described in detail below. The α-sialon is obtained by solid-dissolving a slight amount of metal M in a composition comprising Si, Al, O and N, and this is represented by the following formula (1):

(1)

and the α-sialon based phosphor is obtained by displacing a part of the solid-dissolved metal M with a lanthanide metal Ln working as the center of light emission.

The metal M solid-dissolved is at least one metal selected from Ca, Mg, Y and Li, and the lanthanide metal Ln working as the center of light emission is at least one member selected from Eu, Dy, Er, Tb, Yb and Ce. In formula (1), assuming that the valence of metal M is a and the valence of lanthanide metal Ln is b, ax+by=m.

In formula (1), the factors m and n are $0.3 \leq m < 4.5$ and $0 < n < 2.25$. If m and n are out of respective ranges, α-sialon is hardly formed and this is not preferred. The factors m and n are more preferably $1.0 \leq m \leq 3.5$ and $0.5 \leq n \leq 2.0$.

In the α-Sialon phosphor of the present invention, it is preferred that the metal M comprises (i) at least one of Ca, Mg and Y as well as (ii) Li, and this α-Sialon phosphor is represented by the following formula (2):

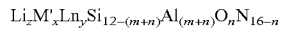

In formula (2), M' is at least one metal selected from Ca, Mg and Y. Ln, m and n are as defined in formula (1). In formula (2), assuming that the valence of metal M is a and the valence of lanthanide metal Ln is b, z+ax+by=m. In formula (2), the factor z of Li is preferably larger than 0 and up to 0.8. The lithium mixed even in a very small amount exerts an effect and the photoluminescent intensity is remarkably enhanced. However, if z exceeds 0.8, the photoluminescent intensity tends to decrease. The content (factor z) of Li is more preferably from 0.01 to 0.3, still more preferably from 0.03 to 0.2. With the content in this range, a higher photoluminescent intensity can be obtained.

The color of the photoluminescent light of the phosphor where the metal M solid-dissolved in α-sialon is Ca and the lanthanide metal Ln is Eu is yellow (wavelength: about 560 to 590 nm) and this is optimal for obtaining white LED.

The method for producing an α-sialon based phosphor of the present invention is described below. The powder of the α-sialon based phosphor of the present invention is obtained by mixing (a) a silicon nitride powder containing both an amorphous component and a crystalline component, (b) a substance containing AlN and working as aluminum source, (c) an oxide of the metal M or a precursor substance to the oxide upon thermal decomposition, and (d) an oxide of the lanthanide metal Ln or a precursor substance to the oxide upon thermal decomposition to give a desired α-sialon composition, and firing the resulting mixed powder at 1,400 to 2,000° C. in a nitrogen-containing inert gas atmosphere. Here, the substance containing AlN and working as an aluminum source may be an AlN powder alone, a mixture of AlN powder and Al powder, or a mixture of AlN powder and a powder of Al oxide or a precursor substance to an Al oxide upon thermal decomposition, and this works as an Al source and/or a nitrogen or oxygen source of the α-sialon.

Examples of the precursor substances which become an oxide of Al, the precursor substances which become an oxide of metal M, and the precursor substances which become an oxide of lanthanide metal Ln upon thermal decomposition, include nitrides, hydroxides, carbonates and chlorides of respective elements.

More specifically, examples of the Al oxide and the precursor substance to Al oxide upon thermal decomposition include $Al_2O_3$ and $Al(OH)_3$. Examples of the metal M oxide and the precursor substance to the oxide upon thermal decomposition include $CaCO_3$, $Ca(OH)_2$, $CaCl_2$ and $Ca(NO_3)_2$, for example, in the case where M is Ca. Examples of the lanthanide metal Ln oxide and the precursor substance becoming a lanthanide metal Ln oxide upon thermal decomposition include $Eu_2O_3$, $EuCl_3$, $Eu(NO_3)_3$ and $Eu_2(C_2O_4)_3$, for example, in the case where Ln is Eu. The Al oxide or the precursor to Al oxide upon thermal decomposition, the metal M oxide or the precursor substance to metal M oxide upon thermal decomposition, and the lanthanide metal Ln oxide or the precursor substance to the oxide upon thermal decomposition each is preferably used in the powder state.

If a crystalline silicon nitride powder is used as the raw material of silicon nitride powder, this has low reactivity and in a conventional powder synthesis method of mixing raw materials and firing the mixture in a crucible, a large amount of unreacted silicon nitride remains and the sialon powder cannot be efficiently produced. In order to accelerate the reaction, a method of accelerating the reaction, such as hot-pressing treatment, is necessary. In this method, the sialon is obtained as a lump like a sintered body. To obtain a phosphor powder from the lump, a grinding step is necessary but in the grinding step, contamination of impurities occurs and due to contamination of iron or the like harmful to the phosphor, the photoluminescent intensity decreases. In order to avoid such a problem, it is crutical to use, as the raw material, a silicon nitride powder containing both an amorphous component and a crystalline component, obtained by partially crystallizing silicon nitride. The partially crystallized silicon nitride powder has high reactivity and therefore, a sialon powder can be obtained by a simple method of mixing raw materials and firing the mixture in a crucible. The ratio of the crystalline silicon nitride in the silicon nitride raw material powder comprising amorphous silicon nitride and crystalline silicon nitride is preferably from 5 to 95 wt %. If the ratio of crystalline silicon nitride is less than 5%, the grain size of crystal obtained becomes too small and the photoluminescent intensity tends to rather decrease, whereas if the ratio exceeds 95%, the produced sialon powder undergoes strong agglomeration.

Also, when the ratio of crystalline silicon nitride in the silicon nitride raw material powder comprising amorphous silicon nitride and crystalline silicon nitride is from 5 to 95 wt %, the specific surface area of the raw material silicon nitride powder is approximately from 15 to 300 m²/g and this range is preferred because a sialon phosphor powder undergoing less aggregation and giving high light emission intensity can be easily obtained.

The silicon nitride powder containing both an amorphous component and a crystalline component can be efficiently obtained by heat-treating an amorphous silicon nitride powder. The silicon nitride powder obtained by heat-treating an amorphous silicon nitride powder has a small crystal particle size and advantageously allows a uniform reaction to readily proceed. The silicon nitride powder containing both an amorphous component and a crystalline component may also be prepared by mixing an amorphous silicon nitride powder and a crystalline silicon nitride powder.

The amorphous silicon nitride powder can be obtained by thermally decomposing silicon diimide $(Si(NH)_2)$ at about 700 to 1,100° C. in a nitrogen atmosphere.

The method for mixing these starting materials is not particularly limited and a known method such as a method of dry-mixing the starting materials or a method of wet-mixing the starting materials in an inactive solvent substantially incapable of reacting with each component of the raw materials and then removing the solvent, may be employed. As for the mixing device, a V-shaped mixer, a rocking mixer, a ball mill, a vibration mill, a medium stirring mill or the like is suitably used. However, the partially crystallized amorphous silicon nitride powder is very sensitive to water or moisture and therefore, the mixing of starting materials must be performed in a controlled inert gas atmosphere.

The mixture of starting materials may be preferably fired at 1,400 to 1,800° C., preferably from 1,500 to 1,800° C., in a nitrogen-containing inert gas atmosphere under 1 atm. or atmospheric pressure, whereby a desired α-sialon powder is obtained. If the firing temperature is less than 1,400° C., the production of the desired α-sialon powder requires heating for a long time and this is not practical. Also, the ratio of α-sialon phase in the produced powder decreases. On the other hand, if the firing temperature exceeds 1,800° C., this disadvantageously causes sublimation and decomposition of silicon nitride and sialon to produce free silicon.

The mixed powder of starting materials can also be fired at a temperature of 1,600 to 2,000° C., preferably from 1,600 to 1,900° C., in a pressurized nitrogen gas atmosphere. In this case, the pressurization with nitrogen gas prevents the silicon nitride and sialon from sublimation and decomposition at a high temperature and a desired α-sialon based phosphor can be obtained in a short time. By increasing the nitrogen gas pressure, the firing temperature can be elevated, but the mixed powder can be fired, for example, at 1,600 to 1,850° C. under a nitrogen gas pressure of 5 atm and at 1,600 to 2,000° C. under a nitrogen gas pressure of 10 atm.

The heating furnace used for the firing of powder mixture is not particularly limited and, for example, a batch electric furnace heated by a high frequency induction heating system or resistance heating system, a rotary kiln, a fluidized kiln or a pusher type electric furnace can be used.

The α-sialon based phosphor of the present invention is characterized in that aggregation less occurs and the size distribution is narrow as compared with those using a crystalline silicon nitride powder as the raw material. The 50% size in the particle size distribution curve of the α-sialon based phosphor of the present invention is from 2 to 19 μm, preferably from 3.5 to 17.5 μm. If the 50% size is less than 2 μm, the light emission intensity seriously decreases. This is considered to occur due to increase of defects on the particle surface. On the other hand, if the 50% size exceeds 19 μm, extremely non-uniform light emission intensity disadvantageously results due to aggregation of particles.

The α-sialon based phosphor activated with a rare earth element of the present invention may be kneaded with a transparent resin such as epoxy resin or acrylic resin by a known method to produce a coating agent, and a light emitting diode (LED) coated with this coating agent is used as a light conversion element.

EXAMPLES

Examples 1 to 6

Silicon diimide obtained by reacting silicon tetrachloride with ammonia at room temperature was decomposed under heating at a temperature in the range from 1,150 to 1,350° C. to obtain 6 kinds of a silicon nitride powder containing both an amorphous component and a crystalline component. The heating temperature of silicon diimide, and the crystallinity and the specific surface area of obtained silicon nitride powder are shown in Table 1.

The crystallinity was determined by hydrolyzing the amorphous component of the silicon nitride powder and measuring the weight of the residue.

With each of the obtained powders, an aluminum nitride powder, a calcium carbonate powder and a europium oxide powder which were weighed to give a composition of $Ca_{0.525}Eu_{0.15}Si_{9.75}Al_{2.25}O_{0.75}N_{15.25}$, were mixed by a vibration mill for 1 hour in a nitrogen atmosphere. The mixed powder was filled in an SiC-coated carbon crucible, the crucible was set in a high-frequency heating furnace, and the furnace was heated in a nitrogen gas atmosphere according to a temperature-increasing schedule of holding the furnace at from room temperature to 1,200° C. for 1 hour, at from 1,200 to 1,400° C. for 4 hours and at from 1,400 to 1,600° C. for 2.5 hours, whereby a sialon powder was obtained.

This powder was evaluated on photoluminescent properties by a photoluminescent measuring apparatus set to an excitation wavelength of 450 nm. FIG. 1 shows the photoluminescent spectrum. The size distribution of each sialon powder obtained is shown in Table 1.

Comparative Example 1

Silicon diimide obtained by reacting silicon tetrachloride with ammonia at room temperature was decomposed and crystallized under heating up to 1,550° C. to obtain a crystalline silicon nitride powder. With this raw material, an aluminum nitride powder, a calcium carbonate powder and a europium oxide powder which were weighed to give a composition of $Ca_{0.525}Eu_{0.15}Si_{9.75}Al_{2.25}O_{0.75}N_{15.25}$, were mixed by a vibration mill for 1 hour in a nitrogen atmosphere.

The mixed powder was filled in an SiC-coated carbon crucible, the crucible was set in a high-frequency heating furnace, and the furnace was heated in a nitrogen gas atmosphere according to a temperature-increasing schedule of holding the furnace at from room temperature to 1,200° C. for 1 hour, at from 1,200 to 1,400° C. for 4 hours and at from 1,400 to 1,600° C. for 2.5 hours, whereby a sialon powder was obtained. This powder was strongly agglomerated and the raw material in the crucible became one lump.

The lump was crushed in an agate mortar and then evaluated on photoluminescent properties by a photoluminescent measuring apparatus set to an excitation wavelength of 450 nm. FIG. 1 shows the photoluminescent spectrum. The size distribution of the sialon powder obtained is shown in Table 1. As seen from Table 1 and FIG. 1, when a partially crystallized amorphous silicon nitride is used as the raw material, the large agglomerated particle is hardly produced, the size distribution is narrower and the photoluminescent intensity is higher.

TABLE 1

| | Heating Temperature ° C. | Crystallinity % | Specific Surface Area m²/g | Particle Size Distribution of Sialon Powder | | |
|---|---|---|---|---|---|---|
| | | | | 10% size | 50% size | 90% size |
| Example 1 | 1150 | 11.8 | 227 | 0.5 | 2.5 | 12 |
| Example 2 | 1170 | 35.4 | 150 | 0.7 | 3.8 | 21 |
| Example 3 | 1190 | 50.3 | 105 | 0.9 | 7.2 | 37 |
| Example 4 | 1250 | 76.5 | 40 | 1.3 | 12.1 | 40 |
| Example 5 | 1300 | 84.6 | 27 | 1.6 | 15.3 | 51 |
| Example 6 | 1350 | 89.4 | 15 | 1.9 | 19.1 | 83 |
| Comparative Example 1 | 1550 | 100 | 10 | 2.1 | 30.2 | 131 |

INDUSTRIAL APPLICABILITY

According to the production method of the present invention, a phosphor powder limited in the size of agglomerated powder and narrow in the particle size distribution can be obtained. This phosphor powder can be readily mixed with a resin or the like and coated on blue LED, and high-brightness white LED can be easily obtained.

The invention claimed is:

1. A method for producing a sialon-based phosphor, comprising
mixing a silicon nitride raw material powder with an AlN-containing substance acting as an aluminum source, an oxide of metal M (wherein M is at least one metal selected from Ca, Mg, Y and Li) or a precursor substance to an oxide of metal M upon thermal decomposition, and an oxide of lanthanide metal Ln or a precursor substance to an oxide of lanthanide metal Ln upon thermal decomposition, and
firing the mixture at 1,400 to 2,000° C. in an inert gas atmosphere containing nitrogen to produce an α-sialon based phosphor represented by the formula:

$$M_xLn_ySi_{12-(m+n)}Al_{(m+n)}O_nN_{16-n}$$

wherein M is at least one metal selected from Ca, Mg, Y and Li, Ln is at least one lanthanide metal selected from Eu, Dy, Er, Tb, Yb and Ce, ax+by=m (assuming that the valence of metal M is a and the valence of lanthanide metal Ln is b), $0<x\leq1.5$, $0.3\leq m<4.5$, and $0<n<2.25$,
wherein said silicon nitride raw material powder comprises amorphous silicon nitride and crystalline silicon nitride.

2. The method for producing a sialon-based phosphor as claimed in claim 1, wherein the ratio of the crystalline silicon nitride in said silicon nitride raw material powder is from 5 to 95 wt %.

3. The method for producing a sialon-based phosphor as claimed in claim 1, wherein the specific surface area of said silicon nitride raw material is from 15 to 300 m²/g.

4. The method for producing a sialon-based phosphor as claimed in claim 1, wherein said silicon nitride raw material is a silicon nitride powder obtained by heat-treating an amorphous silicon nitride powder.

5. The method for producing a sialon-based phosphor as claimed in claim 4, wherein said amorphous silicon nitride powder is an amorphous silicon nitride powder obtained by thermally decomposing silicon diimide (Si(NH)₂).

* * * * *